United States Patent [19]

Reinhart

[11] Patent Number: 5,236,972
[45] Date of Patent: Aug. 17, 1993

[54] THERMOPLASTIC POWDER SLURRY FOR FIBER IMPREGNATION AND FILM FORMATION

[75] Inventor: Theodore J. Reinhart, Dayton, Ohio

[73] Assignee: The United States of America as represented by the Secretary of the Air Force, Washington, D.C.

[21] Appl. No.: 844,963

[22] Filed: Feb. 28, 1992

Related U.S. Application Data

[63] Continuation of Ser. No. 586,322, Sep. 20, 1990, abandoned, which is a continuation-in-part of Ser. No. 376,279, Jul. 5, 1989, abandoned.

[51] Int. Cl.$^5$ ............... C08L 61/00; C08L 71/00; C08L 81/04
[52] U.S. Cl. .................... 523/122; 524/502; 524/592; 524/609
[58] Field of Search ............... 523/122; 524/502, 592, 524/609

[56] References Cited

U.S. PATENT DOCUMENTS

| | | | |
|---|---|---|---|
| 3,826,825 | 7/1974 | Dowd et al. | 523/122 |
| 3,925,504 | 12/1975 | Koleske et al. | 525/415 |
| 3,993,713 | 11/1976 | VanBrederode et al. | 528/498 |
| 4,005,003 | 1/1977 | Georgeau et al. | 204/290 F |
| 4,173,665 | 11/1979 | Nida | 523/122 |
| 4,278,576 | 7/1981 | Goldman | 523/201 |
| 4,388,373 | 6/1983 | Longo et al. | 428/413 |
| 4,444,806 | 4/1984 | Morgan et al. | 427/451 |
| 4,548,977 | 10/1985 | South, Jr. | 524/609 |
| 4,551,179 | 11/1985 | Mark | 44/51 |
| 4,707,297 | 11/1987 | Paske, Jr. et al. | 528/277 |
| 4,752,628 | 6/1988 | Payne | 523/122 |
| 4,764,213 | 8/1988 | Guenter et al. | 524/502 |
| 4,799,985 | 1/1989 | McMahon et al. | 156/166 |
| 4,818,318 | 4/1989 | McMahon et al. | 156/166 |
| 4,826,927 | 5/1989 | Schmid et al. | 525/422 |
| 4,851,456 | 7/1989 | Dean | 523/122 |
| 4,921,558 | 5/1990 | Johnson et al. | 524/609 |

OTHER PUBLICATIONS

"Electronic Uses Spur Growth of High-Performance Plastics" by Marc S. Reisch (*Chemical & Engineering News*), Sep. 1989, pp. 21–49.

*Primary Examiner*—Joseph L. Schofer
*Assistant Examiner*—R. H. Delmendo
*Attorney, Agent, or Firm*—Fredric L. Sinder; Donald J. Singer

[57] ABSTRACT

A thermoplastic powder slurry for making fiber reinforced composite structure prepregs having tack, drape and easy handleability is disclosed. A slurry of thermoplastic resin powder suspended in a solution of distilled water, a water-soluble polymer, a wetting agent, a biocide, a plasticizer and an antifoamer, which is used to impregnate suitable reinforcing fibers, either continuous or woven, makes a prepreg having tack, drape and easy handleability. The slurry may also include a viscosity reducer. The disclosed slurry can also be drawn into an adhesive tape or film.

2 Claims, 3 Drawing Sheets

THERMOPLASTIC POWDER SLURRY FOR FIBER IMPREGNATION AND FILM FORMATION

RIGHTS OF THE GOVERNMENT

The invention described herein may be manufactured and used by or for the Government of the U.S. for all governmental purposes without the payment of any royalty.

This application is a continuation, of application Ser. No. 07,586,322, filed Sept. 20, 1990, now abandoned, which is a continuation-in-part, of application Ser. No. 07/376,279, filed Jul. 5, 1989, now abandoned.

BACKGROUND OF THE INVENTION

The present invention relates generally to preimpregnated fiber material, or prepregs, for making fiber reinforced composite structures, and more specifically to a slurry of powdered thermoplastic resin and appropriate additives for making thermoplastic resin prepregs having tack, drape and easy handleability.

Advanced, or high-performance, composites are high modulus (stiffness), high strength composite materials used in applications requiring high strength to weight ratios. They are typically made by embedding very high stiffness fibers, such as glass, carbon or silicon carbide, into a polymer matrix. The polymer matrix may be made either from thermosetting resins, such as an epoxy or polyester resin, or from thermoplastic resins, such as nylons, polycarbonates, acetals, polyethylenes, some polyesters, polysulfone and polyetheretherketone. Thermosetting resins take a permanent set when molded, and cannot thereafter be remolded. Thermoplastic resins become soft and pliable when heated and may be remolded without changing their physical properties. The embedded fibers provide stiffness and strength to the composite material, but are brittle and highly sensitive to cracks and flaws. The matrix material absorbs energy and hinders and spread of small cracks. The presence of a matrix allows a closer approach to using the theoretical maximum strength of the fibers in practical applications.

One method for making composite material is by impregnating an assembly of fibers with a flowable blend of resin powder and other materials, and then drying to produce a preimpregnated fiber material, commonly called a prepreg. Prepregs are fabricated into desired structural shapes by methods such as laying up and then curing under heat and pressure to make a structure component.

Unfortunately, conventional prepregs, particularly thermoplastic resin prepregs. (stickiness) or drape (tendency to fall onto and conform to the shape of a substrate). They are very difficult to handle in fabricating composite structures, particularly the complex shapes of aircraft and missile structures. They generally must be hot-pressed to fit and do not easily maintain either a desired position or shape during the lay up process.

The prior art includes at least one example of a drapeable prepreg called a commingled prepreg. Thermoplastic material is extruded to make a thermoplastic fiber that is woven with the reinforcing fibers to make a fabric. Under heat and roller pressure, the thermoplastic melts to impregnate the reinforcing fibers. Unfortunately, commingled prepregs are expensive and difficult to make.

Thus it is seen that there is a need for thermoplastic resin prepregs having tack, drape and easy handleability, properties now generally available only with thermosetting resin prepregs, and for an efficient method of making them.

It is, therefore, a principle object of the present invention to provide a slurry of thermoplastic polymer resin and appropriate additives that, when impregnated into continuous fibers, produces prepregs having tack, drape and easy handleability.

It is a feature of the present invention that its disclosed polymer resin slurry can be made into adhesive tapes and films for bonding together composite and other structures.

It is an advantage of the present invention that it is straightforward, efficient and easily adaptable to present methods for making prepregs and adhesive tapes and films.

These and other objects, features and advantages of the present invention will become apparent as the description of certain representative embodiments proceeds.

SUMMARY OF THE INVENTION

The present invention provides a flowable blend of polymer resin and appropriate additives for making thermoplastic resin prepregs having tack, drape and easy handleability. The unique discovery of the present invention is that a slurry made by suspending thermoplastic polymer resin powder in a solution of water, a water-soluble polymer, appropriate wetting agents, biocides, plasticizers and antifoamers will, when impregnated into fiber material, make a composite prepreg material having tack, drape and easy handleability. The slurry can also be made into an adhesive film or tape for bonding together composite structures.

Accordingly, the present invention is directed to a flowable material for impregnating reinforcing fibers to make polymer resin prepregs and for making adhesive films and tapes, comprising a slurry of a polymer resin powder dispersed in a solution comprising water, a water-soluble polymer, a wetting agent, a biocide, a plasticizer and an antifoamer. The flowable material may include a viscosity reducer.

The invention is also directed to a flowable material comprising a slurry of a polymer resin powder dispersed in a solution comprising water, about 1 to 10 percent by weight of the solution of a water-soluble polymer, about 0.05 to 1 percent by weight of the solution of a wetting agent, about 0.01 to 5 percent by weight of the solution of a biocide, about 0.01 to 1 percent by weight of the solution of a plasticizer and about 0.01 to 1 percent by weight of the solution of an antifoamer. The flowable material may include about 0.1 to 5 percent by weight of the solution of a viscosity reducer.

The invention is further directed to a method for making a polymer resin prepreg having tack and drape, comprising the steps of providing a plurality of suitable reinforcing fibers, preparing a slurry of a polymer resin powder suspended in a solution comprising water, a water-soluble polymer, a wetting agent, a biocide, a plasticizer and an antifoamer and impregnating the reinforcing fibers with the slurry. The method may include the slurry including a viscosity reducer.

The invention is yet further directed to a method for making an adhesive film or tape, comprising the steps of preparing a slurry of a polymer resin powder suspended in a solution comprising water, a water-soluble polymer, a wetting agent, a biocide, a plasticizer and an antifoamer and forming the slurry into the shape of a film and then drying the slurry. The method may include the slurry including a viscosity reducer.

DESCRIPTION OF THE DRAWINGS

The present invention will be more clearly understood from a reading of the following detailed description in conjunction with the accompanying drawings wherein.

DETAILED DESCRIPTION

Figure 1:
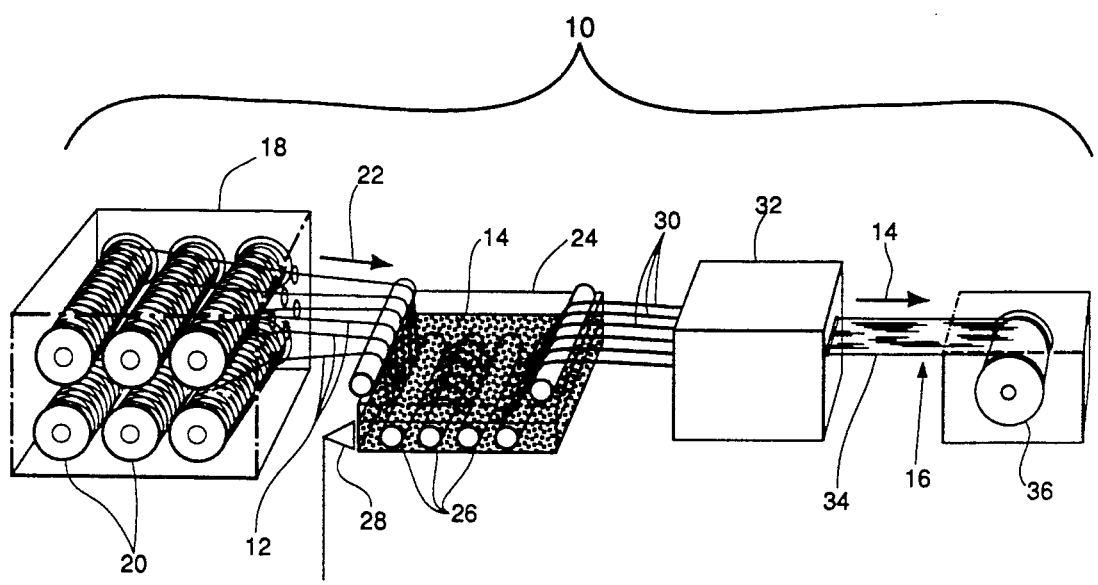
FIG. 1 is a simplified perspective view of an apparatus for impregnating continuous reinforcing fiber with a thermoplastic resin powder slurry to make a thermoplastic resin prepreg according to the teachings of the present invention.

Referring now to FIG. 1 of the drawings, there is shown a simplified perspective view of an apparatus 10 for impregnating continuous reinforcing fiber 12 with a polymer resin powder slurry 14 to make a polymer resin prepreg 16 according to the teachings of the present invention. An enclosed creel 18 holds several spools 20 of suitable continuous reinforcing fiber such as graphite, glass or Kevlar ®. Fiber 12 travels in direction 22 and is fed to a fiber impregnation tank 24, where it is guided by a series of pulleys 26 through slurry 14. A series of pins or other apparatus help spread and separate the fibers so that they are completely covered by slurry 14 and fully pick up the dispersed resin powder. A ultrasonic process aid 28 helps maintain good dispersion of slurry ingredients and encourages the impregnation of fibers 12. From fiber impregnation tank 24, impregnated fibers 30 pass through drying oven 32 and emerge as prepreg 34, which is wound on takeup drum or spool 36. An actual prepreg will include many more reinforcing fibers than are shown in this simplified Figure.

The desired properties of tack, drape and easy handleability present in prepreg 34 are provided by the formulation of slurry 14. Slurry 14 comprises thermoplastic resin powder suspended in a solution of distilled water, a water-soluble polymer, a surface tension reducing (or wetting) agent, a biocide, a plasticizer and an antifoamer. A viscosity reducer may also be added.

A typical formulation of a slurry suitable for impregnating graphite fibers according to the teachings of the present invention would be as follows:
6 gms POLYOX SR 301 (Union Carbide)
594 gms Distilled Water
1 gm FC 430 FLUORAD
0.01 gms DOWICIDE A (Dow)
0.05 gms Propylene Glycol (Dow)
0.01 gms ANTIFOAM A (Dow)
0.05 gms TRITON X-400 X-400 (Rohm & Haas)
10 to 100 gms PEEK (Polyetheretherketone Powder 150 to 300 mesh) (ICI Americas)

POLYOX is a water-soluble polymer (any of a range of nonionic poly(ethylene oxide) homopolymers of high molecular weight) that acts as a binder for the slurry during the impregnation process. The distilled water is the primary flowable carrier for the slurry. The distilled water evaporates during a drying step of the impregnation process. FLUORAD is a surface tension reducing (or wetting) agent (long-chain perfluoroalkanecarboxylic acids) for the slurry. DOWICIDE A is a biocide (sodium-o-phenyl-phenate tetrahydrate) that acts to prevent mold growth in the final prepreg. Stored prepregs are susceptible to mold and other growths from the amount of organic material in their structure. The Propylene Glycol is a plasticizer which acts to provide flexiblity to the final prepreg. ANTIFOAM is any of a variety of commonly available antifoaming chemicals such as Tri-n-butyl-phosphate and simethicone. TRITON X-400 is another wetting agent (any of a series of octoxynols including octylphenoxy polyethoxyethanol) particularly suitable as a wetting agent to allow the slurry to more successfully adhere to graphite fibers. PEEK is a thermoplastic resin powder (polyetheretherketone) particularly suitable for use as a'matrix material with graphite fibers. Polyphenylene sulfide is another thermoplastic resin that is particularly suitable for use with glass fibers.

The disclosed slurry can be improved by the addition of a viscosity reducer (or depressant) to control the viscosity of the slurry solution for improved wetting and ease of handling. 0.5 gms of 1-Octanol would be an appropriate amount to add to the disclosed slurry.

To prepare the disclosed slurry, first the POLYOX solution with water is prepared by standard methods and the other formulation ingredients then added. Lastly, the thermoplastic resin powder is blended, or dispersed, into the solution to make the slurry.

The disclosed slurry can be additionally improved by the addition of metallic or mineral powder fillers to increase the modulus properties of the resulting thermoplastic resin matrix, as taught in companion US application Ser. No. 07/376,280, now U.S. Pat. No. H001,029, Particulate Additives to Increase the Modulus of Thermoplastic Materials, by the same inventor, which companion application is hereby incorporated by reference as if fully rewritten.

Other slurry ingredients from a variety of different suppliers can be substituted for the disclosed ingredients to make a slurry having the same or modified properties. For example, for the water-soluble polymer can be substituted, from Hercules Corp., KLUCEL M or CMC 7 (hydroxypropylcellulose, a nonionic water-soluble cellulose ether); from Dow Chemical, METHOCEL K100 M (hydroxypropyl methylcellulose); from GAF Corp., PVP K90 (ANEX 90L) (polyvinylpyrrolidone); from Dupont, ELVANOL (PVA) (a medium viscosity, fully hydrolyzed grade of polyvinyl alcohol); from Rohm & Haas, TAMOL 850, TAMOL 731 a combination of formaldehyde and naphthalene-sulfonic acid or ACRYSOL LMW 45 (an alkali swellable acrylic polymer emulsion); and, from B. F. Goodrich, CARBOPOL Polymers (a carboxyvinyl polymer). For the wetting agent can be substituted, from 3M Company, FLUORAD 430 and 431. For the biocide can be substituted, from Dow Chemical, DOWICIDE 100. For the plasticizer can be substituted, from Dow Chemical, Propylene Glycol, Glycerine nd Ethylene Glycol. For the antifoamer can be substituted, from Dow Chemical, ANTIFOAM AF and ANTIFOAM C. For the viscosity reducer can be substituted some of the higher alcohols as well as 1,3-Butanediol and the glycol family of materials. Those with skill in the art of the invention will readily see the possible variations in slurry and resulting prepreg properties that may be achieved by modifying the choice of ingredients.

The range of ingredient percentages, by weight, compared to total solution (not including polymer resin powder or matrix reinforcing metallic or mineral powder), that have been successfully tested, are as follows:

| | |
|---|---|
| Water-soluble Polymer | 1–10% |
| Wetting agents | .05–1% |
| Biocide | .01–5% |
| Plasticizer | .01–1% |
| Antifoamer | .01–1% |
| Viscosity reducer | 0.1–1% |
| Thermoplastic Powder | 1–200% |
| Metallic Filler (Ferrite or Aluminum Powder) | 1–25% |
| Mineral Filler (.05 micron $TiO_2$) | 1–10% |

Figure 2:
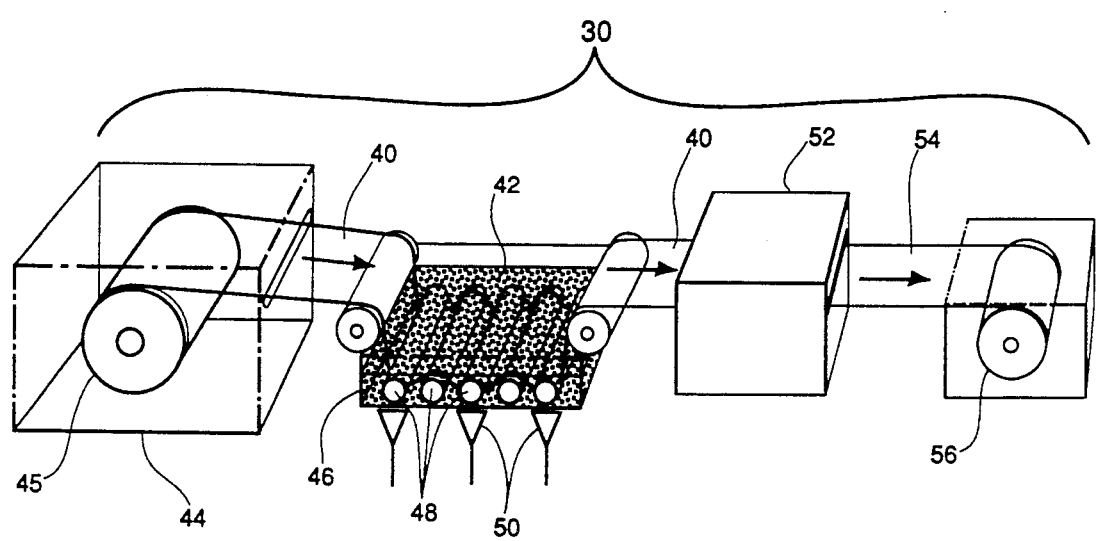
FIG. 2 is a simplified perspective view of an apparatus for impregnating cloth or woven fiber with a thermoplastic resin powder slurry to make a thermoplastic resin prepreg according to the teachings of the present invention; and, FIG. 3 is a simplified perspective view of an apparatus for making a thermoplastic resin powder slurry, made according to the teachings of the present invention, into an adhesive tape or film.
Figure 3:
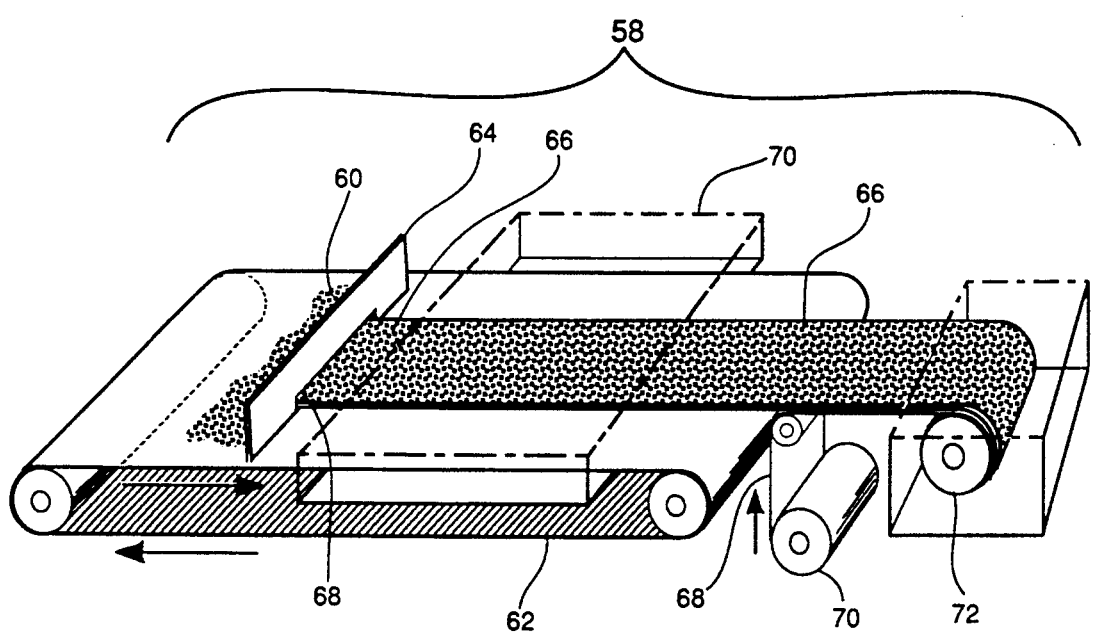

The range of ingredient percentages used for successfully making continuous reinforcing fiber prepregs, as shown in FIG. 1, tend to be less than the ingredient percentages needed for successfully making cloth or woven prepregs, as shown in FIG. 2, or for making adhesive tapes and films as shown in FIG. 3. Thermoplastic resin powder percentages of about 30% are typical for such FIG. 1 prepregs. The percentage of water-soluble polymer needed for successfully making cloth or woven prepregs, or adhesive tapes and films, is about 5–10%, with similar increases for the other ingredients. The percentage of thermoplastic resin powder is about 50–100% and the precentage of metallic or mineral fillers about 5–10%.

FIG. 2 shows a simplified perspective view of an apparatus 38 for impregnating cloth or woven fiber 40 with a thermoplastic resin powder slurry 42 to make a thermoplastic resin prepreg according to the teachings of the present invention. An enclosed creel 44 holds a spool 45 of cloth web 40, woven of suitable fibers such as graphite, glass or Kevlar ®. Cloth web 40 is fed to an impregnation tank 46, where it is guided by a series of pulleys 48 thorough slurry 42. Ultrasonic activators 50 maintain good dispersion of slurry ingredients and encourage the impregnation of cloth web 40. From fiber impregnation tank 46, cloth web 40 passes through drying system 52 and emerges as prepreg 54, which is wound on takeup roll 56.

FIG. 3 shows a simplified perspective view of an apparatus 58 for making an adhesive tape or film from a thermoplastic resin powder slurry 60 made according to the teachings of the present invention. An endless loop 62 runs under an adjustable doctor blade 64. A bank of thermoplastic resin powder slurry 60 is maintained against one side of doctor blade 64. Loop 62 draws a tape or film 66 through an opening 68 made by doctor blade 64. Heating system 70 dries tape or film 66, which is then combined with a separating film 68, supplied from separating film applicator 70, and wound on take up spool 72. The adhesive film may be used later as an adhesive to bond composite structures in conventional or induction bonding applications.

The disclosed invention successfully demonstrates the use of a flowable blend of polymer resin and appropriate additives for making thermoplastic resin prepregs having tack, drape and easy handleability. Although the disclosed use is specialized, its teachings will find application in other areas where it is desired to improve the workability of interim components of a manufacturing system.

It is understood that modifications to the invention as described may be made, as might occur to one with skill in the field of the invention, within the intended scope of the claims. Therefore, all embodiments contemplated have not been shown in complete detail. Other embodiments may be developed without departing from the spirit of the invention or from the scope of the claims.

I claim:

1. A slurry for impregnating reinforcing fibers to make polymer resin prepregs and for making adhesive films and tapes, comprising:
   (a) a thermoplastic polymer resin powder, wherein the thermoplastic resin powder comprises polyetheretherketone;
   (b) water;
   (c) 1 to 10 percent by weight of the slurry less the resin powder of a water-soluble polymer;
   (d) about 0.05 to 1 percent by weight of the slurry less the resin powder of a wetting agent;
   (e) about 0.01 to 1 percent by weight of the slurry less the resin powder of a biocide;
   (f) 0.01 to 1 percent by weight of the slurry less the resin powder of a plasticizer; and,
   (g) about 0.01 to 1 percent by weight of the slurry less the resin powder of an antifoamer.

2. A slurry for impregnating reinforcing fibers to make polymer resin prepregs and for making adhesive films and tapes, comprising:
   (a) a thermoplastic polymer resin powder, wherein the thermoplastic resin powder comprises polyphenylene sulfide;
   (b) water;
   (c) 1 to 10 percent by weight of the slurry less the resin powder of a water-soluble polymer;
   (d) about 0.05 to 1 percent by weight of the slurry less the resin powder of a wetting agent;
   (e) about 0.01 to 1 percent by weight of the slurry less the resin powder of a biocide;
   (f) 0.01 to 1 percent by weight of the slurry less the resin powder of a plasticizer; and,
   (g) about 0.01 to 1 percent by weight of the slurry less the resin powder of an antifoamer.

* * * * *